US006695092B2

(12) United States Patent
Cole

(10) Patent No.: US 6,695,092 B2
(45) Date of Patent: Feb. 24, 2004

(54) STEERING ACTUATOR SYSTEM

(75) Inventor: Michael J. Cole, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 22 days.

(21) Appl. No.: 10/091,058

(22) Filed: Mar. 4, 2002

(65) Prior Publication Data

US 2003/0164260 A1 Sep. 4, 2003

(51) Int. Cl.[7] .................................................. B62D 5/04
(52) U.S. Cl. ........................................ 180/444; 180/143
(58) Field of Search ................................. 180/443–446; 74/388 PS

(56) References Cited

U.S. PATENT DOCUMENTS

| | | | | |
|---|---|---|---|---|
| 4,880,074 A | * | 11/1989 | Matsumoto | 180/444 |
| 5,174,407 A | * | 12/1992 | Shimizu et al. | 180/444 |
| 5,267,625 A | * | 12/1993 | Shimizu | 180/443 |
| 5,423,391 A | * | 6/1995 | Shimizu | 180/446 |
| 6,343,671 B1 | * | 2/2002 | Ackermann et al. | 180/444 |
| 6,374,693 B1 | * | 4/2002 | Kawabe et al. | 74/499 |
| 6,419,043 B1 | * | 7/2002 | Duval et al. | 180/444 |

\* cited by examiner

*Primary Examiner*—Lesley D. Morris
*Assistant Examiner*—L. Lum
(74) *Attorney, Agent, or Firm*—Michael D. Smith

(57) ABSTRACT

The steering actuator system disclosed includes a driver feedback rack for receiving input from a steering wheel and a vehicle steering rack, separate from the driver feedback rack. A variable feedback device connects the driver feedback rack to the vehicle steering rack, such that linear motion of the driver feedback rack is translated to variable linear motion of the vehicle steering rack through the variable feedback device. Also, linear motion of the steering rack can be translated into variable linear motion of the driver feedback rack through the variable feedback device.

23 Claims, 3 Drawing Sheets

STEERING ACTUATOR SYSTEM

BACKGROUND

This invention relates to a steering actuator, and more particularly, this invention relates to a steering actuator capable of providing variable ratio steering, variable steering force feedback, and driver transparent autonomous steering.

Steering systems function to assist a vehicle operator in directing the road wheels in order to steer the vehicle. In conventional steering systems, the operator controls the direction of the vehicle with the aid of a hand wheel mechanically connected to the road wheels.

Rack and pinion steering has become a common type of steering on vehicles. In a typical example, a pinion gear is attached to the steering shaft of a steering wheel. When the steering wheel is turned by the operator, the pinion gear spins which moves a rack. Connected to each end of the rack is a tie rod which is connected in some fashion to the wheels of the vehicle. Thus, the rack and pinion system converts the rotational motion of the steering wheel into linear motion which turns the wheels of the vehicle.

Some vehicles employ variable ratio steering which utilize a different number of teeth per inch in the center of the rack than on an outer portion of the rack. In effect, varying the number of teeth per inch can allow a manufacturer of a vehicle to embrace desired advantages, such as allowing the vehicle to responds quickly at the outset of a turn when the rack is near the center and reducing driver effort near the wheel's turning limits.

BRIEF SUMMARY

The steering actuator system includes a driver feedback rack for receiving input from a steering wheel, a vehicle steering rack, separate from the driver feedback rack, and a variable feedback device connecting the driver feedback rack to the vehicle steering rack, wherein linear motion of the driver feedback rack is translated to variable linear motion of the vehicle steering rack through the variable feedback device.

BRIEF DESCRIPTION OF THE DRAWINGS

The steering actuator will now be described, by way of example, with reference to the accompanying drawings, in which.

DETAILED DESCRIPTION OF AN EXEMPLARY EMBODIMENT

Figure 1:
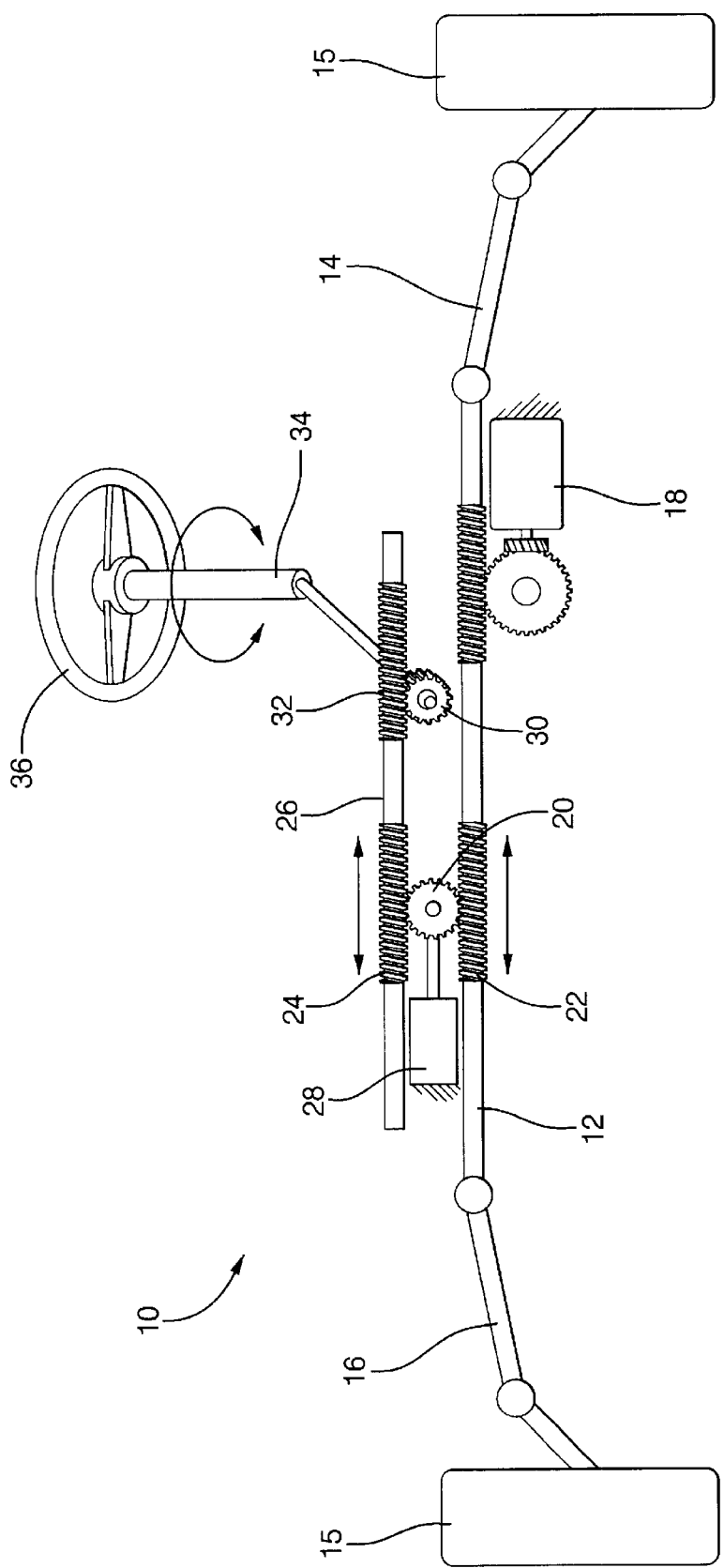
FIG. 1 is a diagrammatic view of a steering actuator system.

Referring to FIG. 1, the steering actuator system 10 incorporable into a motor vehicle may include a primary steering rack 12 that is connected to a set of steerable wheels, shown diagrammatically as wheels 15, by tie rods 14, 16 at both ends. The tie rods 14, K 16 may be connected to the wheels 15 through a steering arm or steering knuckle. This primary steering rack 12 is translated linearly and provided steering force by a steering force application device which includes either electromechanical and/or hydro mechanical means 18, a power source. The electromechanical and/or hydro mechanical means 18 may both assist and/or direct the movement of the rack 12.

This primary steering rack 12 is connected to the variable feedback gear 20. This variable feedback gear 20 is in contact with the primary steering rack 12 along a toothed face 22. The variable feedback gear 20 is also in contact along a toothed face 24 with the feedback rack 26. If there is no movement of the variable feedback gear 20, then the feedback rack 26 and the steering rack 12 move the same distance in opposite directions. If the variable feedback gear 20 is in motion, then racks 26 and 12 can move at any speed relative to each other and in the same or opposite directions relative to each other. The variable feedback gear 20 preferably includes teeth which cooperate with toothed face 22 and toothed face 24. Each of the racks 12 and 26 includes its own longitudinal axis along which movement is imparted in a longitudinal direction, as shown by the arrows. In the example shown in FIG. 1, the teeth on racks 26 and 12 are spaced apart equidistantly. However, the teeth on racks 26 and 12 could have teeth spaced differently in a central portion than an outer portion of faces 22 and 24. Alternatively, the variable feedback gear 20 has two different toothed faces, such as one above the other, and the steering rack 12 could be in contact with one of the toothed faces and the feedback rack 26 could be in contact with the other toothed face. In such an example, the racks 26 and 12 would move in opposite directions, but the distance of movement for each rack would be a ratio determined by the diameters of the feedback gear 20 toothed faces and the gear profiles on the racks 12 and 26.

As the primary steering rack 12 is linearly translated, to steer the vehicle, it may impose a rotation with some amount of torque to the variable feedback gear 20. The amount of rotation and torque is determined by the direction, acceleration, speed, and force linearly transmitted to the position of variable feedback gear 20, by electromechanical and or hydro mechanical means 28 (a motor, drive element, or related device), relative to the primary steering rack 12, as it moves along toothed face 22 of the primary steering rack 12 as it steers the vehicle. In this embodiment, the variable feedback gear 20 is the variable feedback device. The electromechanical and or hydro mechanical means 28 articulates the variable feedback gear 20 against either the movement of the steering rack 12 and or the movement of feedback rack 26. This is where the variable ratios, feedback, and controlled steering is produced. The electromechanical and or hydro mechanical means 28 shown may move the gear 20 in a push or pull type motion as shown by the arrow. That is, the means 28 may impart a force such as through a rod or other connector to the gear 20 in a direction substantially parallel with the racks 26 and 12. The electromechanical and or hydro mechanical means 28 may include sensors, however the position, torque, and or force sensors that are associated with racks 26 and 12 and/or pinion 30 and column 34 may be used and communicated through a steering control unit to the electromechanical and or hydro mechanical means 28. A resultant direction, acceleration, speed and force is imparted to the feedback rack 26 and back to the driver, through feedback steering gear 30, feedback rack toothed face 32, and steering column 34, as variable steering ratios, variable force feedback to the steering wheel 36, and autonomous vehicle steering with no feedback to the steering wheel 36. Without the variable feedback gear 20 activated by the electromechanical and or hydro mechanical means 28, linear movement of one of the racks 12 or 26 would be translated into linear movement of the other of the racks 12 or 26 in a constant, or fixed, ratio. When the variable feedback gear 20 is activated, however, the linear movement translated to either rack 12 or 26 is no longer translated at a fixed ratio, but instead the ratio of movement between the rack 12 and 26 is variable as determined by the needs of the steering system.

Figure 3:
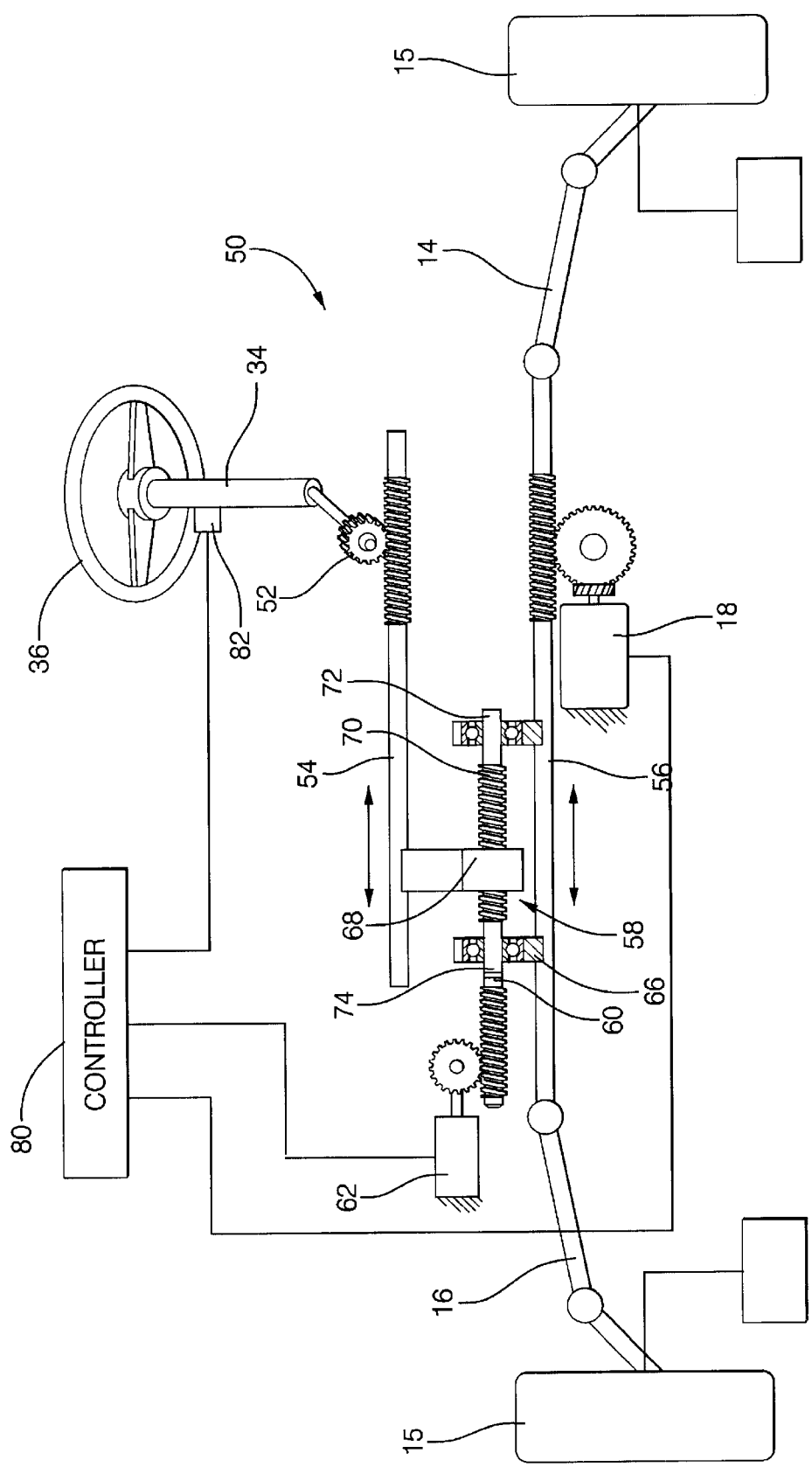
FIG. 3 is another diagrammatic view of the steering actuator system of FIG. 2.

Additional features such as spring return mechanism, various rotational and or linear dampening devices, and the like can be added to the steering actuator system 10 and/or other areas in the steering system to provide enhanced steering effects. The V.F.R.C. (variable ratio force and controlled steering) steering actuator output to the road wheels and feedback to the driver is determined by a steering control unit. (FIG. 3 shows an exemplary steering control unit, controller 80.) Various speed, acceleration, yaw, etc. sensors positioned throughout the vehicle send information to the steering control unit. The steering control unit is responsible for determining the correct amount of directional steering actuation and force feedback to the driver, if any, made by the V.F.R.C. steering actuator system 10. As an example, the wheels 15 may be turning an excessive amount and it is decided through a steering control unit that a proportionate amount of feedback is not to be sent back to the driver. The control unit would direct the means 28 to push or pull the gear 20 such that the feedback to the driver is diminished. As another example, the driver may turn the wheel 36 in a particular situation and if it is determined by the control unit that the amount of wheel turn is not appropriate for the wheels 15 then the control unit could direct the means 28 to push or pull the gear 20 such that the wheels 15 receive the proper amount of turning direction. The control unit may further work with the means 18 for moving the rack 12 in the appropriate direction, longitudinally along the rack axis as indicated by the arrow. This V.F.R.C. steering actuator system 10 can be used as an integral part of a total vehicle safety system.

Figure 2:
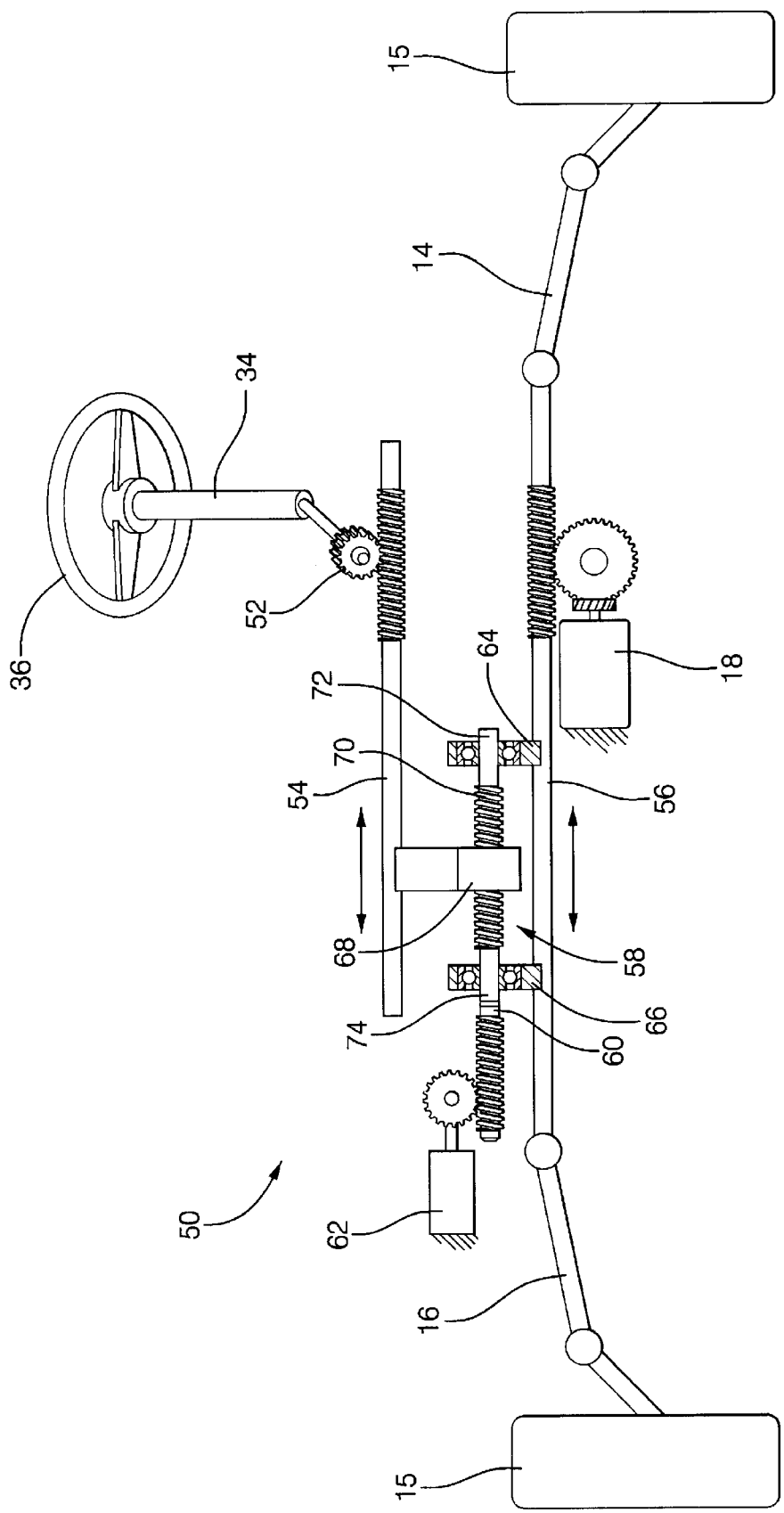
FIG. 2 is a diagrammatic view of an alternate steering actuator system.

In another embodiment of a steering actuator system 50, as shown in FIG. 2, the vehicle driver turns steering wheel 36 which is connected to steering pinion 52 through a steering column 34. Steering pinion 52 (which rotates at the same rpm as the steering wheel 36) is in direct contact with driver feedback rack 54. As steering pinion 52 rotates, it translates the driver feedback rack 54 linearly. Driver feedback rack 54 is connected to vehicle steering rack 56 by the threaded differential input/output device 58. The vehicle steering rack 56 is given power to translate linearly by electromechanical and/or hydro mechanical devices 18. Vehicle steering rack 56 is connected to the road wheels 15 by tie rods 14, 16. The differential input/output of this steering system 50 is achieved by rotating the threaded differential 58 at the sliding rod interface 60 by electromechanical and or hydro mechanical means 62. In this embodiment, the threaded differential 58 is the variable feedback device. When driver feedback rack 54 translates back and forth, it will translate the vehicle steering rack 56 the same linear distance and direction that it travels (and vice versa) until the threaded differential 58 is activated. The threaded differential 58 is activated by the steering system whenever a different steering ratio or controlled steering event is needed. When the threaded differential 58 is activated, a threaded rod 70 is rotated by drive element 62. The threaded rod 70 is connected rigidly to the vehicle steering rack 56 at its ends 72, 74 via holders 64, 66. Ends 72 and 74 are bearings that are mounted in holders 64, 66 which allow the threaded rod 70 to rotate. Although it is shown that holders 64, 66 extend from vehicle steering rack 56 and nut 68 extends from driver feedback rack 54, it should be understood that the holders 64 and 66 could extend from the driver feedback rack 54 and the nut 68 could extend from the vehicle steering rack 56. The threaded differential 58 is also in contact with the driver feedback rack 54 through a nut 68 rigidly connected to the driver feedback rack 54. As the threaded rod 70 rotates through the nut 68 it causes a shift in the linear positions of both the driver feedback rack 54 and the vehicle steering rack 56 relative to each other. This threaded differential 58 can create variable steering ratios, variable force feedback, controlled steering and autonomous vehicle control. Without the threaded differential 58 activated by the electromechanical and or hydro mechanical means 62, linear movement of one of the racks 54 or 56 would be translated into linear movement of the other of the racks 54 or 56 in a constant, or fixed, ratio. When the threaded differential 58 is activated, however, the linear movement translated to either rack 54 or 56 is no longer translated at a fixed ratio, but instead the ratio of movement between the racks 54 and 56 is variable as determined by the needs of the steering system, and communicated by a steering control unit.

This steering actuator system 50 has variations which may include springs, dampers, and similar part layouts that embody the spirit of the invention described here.

Turning now to FIG. 3, controller 80 is shown in the steering actuator system 50 as the steering control unit. The controller 80 receives and directs input to and from torque and position sensor 82 which is connected to steering column 34. The controller 80 also preferably receives and directs input to and from the electromechanical and/or hydro mechanical means 18 and receives and directs input to and from the electromechanical and/or hydro mechanical means 62. The electromechanical and/or hydro mechanical means 18 may be the primary power source and the electromechanical and/or hydro mechanical means 62, a screw motor, may be the secondary power source. In an alternate embodiment, the electromechanical and/or hydro mechanical means 62 may be the primary power source and the electromechanical and/or hydro mechanical means 18 may be the secondary power source, as determined and controlled by controller 80.

While wheels 15 are described as the turnable driving element within the vehicle incorporating this steering actuator system, it should be noted that other types of vehicles could take advantage of this steering actuator system such as those including skis, a single front wheel, or other drivable element.

While certain elements within this disclosure may be described as numerically addressed parts, e.g. first, second, third, etc., such terms are only identifiers and should not be construed as indicating a sequence, position, or an order in time or importance unless otherwise described within the specification.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steering actuator system comprising:
   a driver feedback rack for receiving input from a steering wheel;
   a vehicle steering rack, separate from the driver feedback rack;
   a variable feedback device connecting the driver feedback rack to the vehicle steering rack, the variable feedback device including a rotatable element positioned between the driver feedback rack and the vehicle steering rack, wherein, in an activated state of the variable feedback device, linear motion of the driver feedback rack is translated to variable linear motion of the vehicle steering rack through the variable feedback device.

2. The steering actuator system of claim 1 wherein, in an unactivated state of the variable feedback device, linear motion of the driver feedback rack is translated to linear motion of the vehicle steering rack at a fixed ratio.

3. The steering actuator system of claim 1 further comprising a drive element, wherein the variable feedback device is activatable by the drive element.

4. The steering actuator system of claim 3 further comprising a steering control unit, wherein the steering control unit controls the drive element.

5. The steering actuator system of claim 4 further comprising torque and position sensors, wherein the torque and position sensors send torque and position information to the steering control unit, and wherein the steering control unit uses the torque and position information in controlling the drive element.

6. A steering actuator system comprising:
a driver feedback rack for receiving input from a steering wheel;
a vehicle steering rack, separate from the driver feedback rack;
a variable feedback device connecting the driver feedback rack to the vehicle steering rack, wherein, in an activated state of the variable feedback device, linear motion of the driver feedback rack is translated to variable linear motion of the vehicle steering rack through the variable feedback device, and further wherein the variable feedback device comprises a gear, the driver feedback rack including a toothed face meshing with the gear and the vehicle steering rack including a toothed face meshing with the gear.

7. The steering actuator system of claim 6 wherein the toothed face meshing with the gear of the driver feedback rack is a first toothed face of the driver feedback rack, the driver feedback rack including a second toothed face, the second toothed face meshing with a feedback steering gear.

8. The steering actuator system of claim 7 wherein the feedback steering gear is a pinion.

9. The steering actuator system of claim 1 further comprising a steering force application device connected to one of the driver feedback rack and the vehicle steering rack.

10. The steering actuator system of claim 9 further comprising a steering control unit for gathering information from torque and position sensors, and further comprising a drive element connected to the variable feedback device, wherein the steering control unit controls the steering force application device and the drive element.

11. The steering actuator system of claim 9 wherein the steering force application device includes an electromechanical device.

12. The steering actuator system of claim 9 wherein the steering force application device includes a hydro mechanical device.

13. The steering actuator system of claim 1 wherein the vehicle steering rack includes two ends, each end connected to a tie rod, a turnable element connected to each tie rod.

14. A steering actuator system comprising:
a driver feedback rack for receiving input from a steering wheel;
a vehicle steering rack, separate from the driver feedback rack;
a variable feedback device connecting the driver feedback rack to the vehicle steering rack, wherein, in an activated state of the variable feedback device, linear motion of the driver feedback rack is translated to variable linear motion of the vehicle steering rack through the variable feedback device, and further wherein the variable feedback device includes a threaded rod attached to one of the vehicle steering rack and the driver feedback rack and a nut attached to the other of the vehicle steering rack and the driver feedback rack, the threaded rod passing through the nut.

15. The steering actuator system of claim 14 wherein the nut is threaded.

16. The steering actuator system of claim 14 further comprising a first holder and a second holder, the first holder connecting a first end of the threaded rod to the vehicle steering rack, the second holder connecting a second end of the threaded rod to the vehicle steering rack.

17. The steering actuator system of claim 16 wherein the first holder and the second holder each house bearings for allowing rotation of the threaded rod therein.

18. The steering actuator system of claim 14 further comprising a drive element connected to one end of the threaded rod, the steering actuator system further comprising a steering control unit for receiving torque and position information from torque and position sensors, the drive element controlled by the steering control unit.

19. A steering actuator system comprising:
a steering control unit for receiving torque and position information;
a threaded rod having a first end and a second end, the threaded rod connected to one of a vehicle steering rack and a driver feedback rack at the first end and the second end;
an internally threaded nut rigidly attached to the other of the vehicle steering rack and the driver feedback rack, the nut surrounding the threaded rod; and,
a drive element connected to the second end of the threaded rod, the drive element controlled by the steering control unit;
wherein rotation of the threaded rod via the drive element creates a shift in linear position between the vehicle steering rack and the driver feedback rack at a variable ratio.

20. A steering actuator system comprising:
a steering control unit for receiving torque and position information;
a variable feedback gear, the gear comprising teeth meshing with a toothed face of a vehicle steering rack and a toothed face of a driver feedback rack; and,
a drive element connected to the variable feedback gear, the drive element controlled by the steering control unit;
wherein rotation of the gear via the drive element creates a shift in linear position between the vehicle steering rack and the driver feedback rack at a variable ratio.

21. A method of controlling a steering actuator system, the method comprising:
sending torque and position information to a steering control unit;
positioning a variable feedback device having a rotatable element between a vehicle steering rack and a driver feedback rack;
attaching a drive element to the variable feedback device;
using the torque and position information within the steering control unit to determine whether movement between the vehicle steering rack and the driver feedback rack should be at a fixed ratio or at a variable ratio;
retaining the variable feedback device in an inactivated state when movement between the vehicle steering rack and the driver feedback rack should be at a fixed ratio; and,
activating the drive element through the steering control unit when movement between the vehicle steering rack and the driver feedback rack should be at a variable ratio.

22. The steering actuator system of claim 1 wherein the vehicle steering rack includes two ends, a first end connectable to a first turnable driving element and a second end connectable to a second turnable driving element, wherein the first and second turnable driving elements and the driver feedback rack are separated by the variable feedback device and the vehicle steering rack, and further wherein movement of the first and second turnable driving elements by the steering actuator system is independent of movement of the driver feedback rack.

23. The steering actuator system of claim 1 wherein the rotatable element includes one of a gear and a threaded rod.

* * * * *